US008650255B2

(12) United States Patent
O'Sullivan et al.

(10) Patent No.: US 8,650,255 B2
(45) Date of Patent: Feb. 11, 2014

(54) SYSTEM AND METHOD FOR JOINING A CONVERSATION

(75) Inventors: Patrick Joseph O'Sullivan, Ballsbridge (IE); Robert Cameron Weir, Westford, MA (US); Edith Helen Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/347,127

(22) Filed: Dec. 31, 2008

(65) Prior Publication Data

US 2010/0169435 A1    Jul. 1, 2010

(51) Int. Cl.
*G06F 15/16* (2006.01)
*H04L 12/58* (2006.01)

(52) U.S. Cl.
CPC .................... *H04L 12/585* (2013.01)
USPC ........... 709/206; 709/201; 709/202; 709/203; 709/204; 709/205; 709/207; 709/223; 709/224; 709/225; 709/226; 709/227; 709/228; 709/229; 379/202.01; 379/203.01; 379/204.01; 379/205.01; 370/260; 370/263; 370/264; 370/265

(58) Field of Classification Search
USPC ......... 709/204, 205, 206, 214, 226–227, 201, 709/202, 203, 207, 223, 224, 225, 228, 709/229; 379/202.01, 203.01, 204.01, 379/205.01; 370/260, 264, 265, 263
See application file for complete search history.

(56) References Cited

U.S. PATENT DOCUMENTS

| | | | |
|---|---|---|---|
| 5,623,539 A | 4/1997 | Bassenyemukasa et al. | |
| 6,393,460 B1 * | 5/2002 | Gruen et al. | 709/204 |
| 6,438,111 B1 * | 8/2002 | Catanzaro et al. | 370/260 |
| 6,484,196 B1 | 11/2002 | Maurille | |
| 6,559,863 B1 | 5/2003 | Megiddo | |
| 6,606,644 B1 | 8/2003 | Ford et al. | |
| 6,668,169 B2 | 12/2003 | Burgan et al. | |
| 6,694,351 B1 * | 2/2004 | Shaffer et al. | 709/204 |
| 6,754,631 B1 | 6/2004 | Din | |
| 6,772,195 B1 * | 8/2004 | Hatlelid et al. | 709/204 |
| 6,785,515 B1 | 8/2004 | Sommer et al. | |
| 6,851,053 B1 * | 2/2005 | Liles et al. | 713/168 |
| 6,907,447 B1 | 6/2005 | Cooperman et al. | |
| 6,978,292 B1 * | 12/2005 | Murakami et al. | 709/204 |
| 7,006,455 B1 * | 2/2006 | Fandrianto et al. | 370/260 |
| 7,099,867 B2 * | 8/2006 | Okada et al. | 1/1 |
| 7,124,164 B1 | 10/2006 | Chemtob | |
| 7,124,372 B2 | 10/2006 | Brin | |
| 7,298,831 B1 | 11/2007 | Keohane et al. | |

(Continued)

OTHER PUBLICATIONS

Altun, Arif, "Interaction Management Strategies on IRC and Virtual Chat Rooms", Technology and Teacher Education Annual Telecommunications: Systems and Services (1998), pp. 1222-11227.

(Continued)

*Primary Examiner* — Saket K Daftuar
(74) *Attorney, Agent, or Firm* — Holland & Knight LLP; Brian J Colandreo Esq.; Jeffrey T. Placker Esq.

(57) ABSTRACT

A method and computer program product for receiving a join request, from a requestor, to join an online conversation in which an online user of an instant messaging system is participating. A notification is provided to the online user that the requester would like to join the online conversation.

18 Claims, 4 Drawing Sheets

(56) References Cited

U.S. PATENT DOCUMENTS

| | | | |
|---|---|---|---|
| 7,360,164 B2 | 4/2008 | Bjoernsen et al. | |
| 7,441,027 B2 | 10/2008 | Malik | |
| 7,478,086 B2* | 1/2009 | Samn | 1/1 |
| 7,502,797 B2 | 3/2009 | Schran et al. | |
| 7,571,212 B2 | 8/2009 | Reynolds et al. | |
| 7,689,661 B2* | 3/2010 | Lowery et al. | 709/214 |
| 7,716,289 B2* | 5/2010 | Malik | 709/206 |
| 7,730,081 B2* | 6/2010 | Bromm et al. | 707/769 |
| 7,925,716 B2* | 4/2011 | Zhang et al. | 709/218 |
| 2002/0073208 A1* | 6/2002 | Wilcock et al. | 709/227 |
| 2002/0188681 A1* | 12/2002 | Gruen et al. | 709/204 |
| 2003/0154250 A1* | 8/2003 | Miyashita | 709/204 |
| 2003/0158864 A1* | 8/2003 | Samn | 707/200 |
| 2003/0163525 A1 | 8/2003 | Hendriks et al. | |
| 2003/0195928 A1* | 10/2003 | Kamijo et al. | 709/204 |
| 2003/0212746 A1 | 11/2003 | Fitzpatrick et al. | |
| 2004/0049539 A1 | 3/2004 | Reynolds et al. | |
| 2004/0111479 A1 | 6/2004 | Borden et al. | |
| 2004/0243580 A1* | 12/2004 | Markki et al. | 707/9 |
| 2004/0260701 A1* | 12/2004 | Lehikoinen et al. | 707/10 |
| 2004/0260770 A1 | 12/2004 | Medlin et al. | |
| 2005/0055416 A1 | 3/2005 | Heikes et al. | |
| 2005/0165893 A1* | 7/2005 | Feinberg et al. | 709/205 |
| 2005/0166154 A1* | 7/2005 | Wilson et al. | 715/751 |
| 2005/0223059 A1 | 10/2005 | Ochi et al. | |
| 2005/0223069 A1 | 10/2005 | Cooperman et al. | |
| 2005/0235034 A1 | 10/2005 | Chen et al. | |
| 2005/0265554 A1 | 12/2005 | Walker et al. | |
| 2006/0026232 A1 | 2/2006 | Malik | |
| 2006/0075044 A1* | 4/2006 | Fox et al. | 709/206 |
| 2006/0136298 A1 | 6/2006 | Klein et al. | |
| 2006/0167994 A1 | 7/2006 | Chen et al. | |
| 2006/0182249 A1* | 8/2006 | Archambault et al. | 379/202.01 |
| 2006/0195461 A1 | 8/2006 | Lo et al. | |
| 2006/0195519 A1* | 8/2006 | Slater et al. | 709/204 |
| 2006/0259473 A1* | 11/2006 | Li et al. | 707/3 |
| 2006/0285671 A1* | 12/2006 | Tiruthani et al. | 379/202.01 |
| 2007/0033250 A1 | 2/2007 | Levin et al. | |
| 2007/0088687 A1* | 4/2007 | Bromm et al. | 707/4 |
| 2007/0124312 A1 | 5/2007 | Simpson et al. | |
| 2007/0136432 A1 | 6/2007 | Murakami et al. | |
| 2007/0168433 A1 | 7/2007 | Morgan | |
| 2007/0168445 A1* | 7/2007 | Genty et al. | 709/207 |
| 2007/0168448 A1 | 7/2007 | Garbow et al. | |
| 2007/0226299 A1 | 9/2007 | Shaffer et al. | |
| 2007/0274293 A1 | 11/2007 | Forbes | |
| 2008/0013708 A1* | 1/2008 | Brown et al. | 379/202.01 |
| 2008/0104612 A1 | 5/2008 | Abernethy et al. | |
| 2008/0120261 A1 | 5/2008 | John et al. | |
| 2008/0168095 A1 | 7/2008 | Larcombe et al. | |
| 2008/0168355 A1* | 7/2008 | Dunlap et al. | 715/733 |
| 2008/0189375 A1* | 8/2008 | Chi et al. | 709/206 |
| 2008/0226051 A1* | 9/2008 | Srinivasan | 379/202.01 |
| 2008/0235018 A1 | 9/2008 | Eggen et al. | |
| 2008/0263132 A1* | 10/2008 | Saintloth | 709/203 |
| 2008/0276315 A1* | 11/2008 | Shuster | 726/22 |
| 2008/0294745 A1* | 11/2008 | Lowery et al. | 709/214 |
| 2008/0307112 A1* | 12/2008 | Andreasson et al. | 709/245 |
| 2009/0055485 A1 | 2/2009 | Tsai et al. | |
| 2009/0070421 A1* | 3/2009 | Samn | 709/204 |
| 2009/0083183 A1* | 3/2009 | Rao et al. | 705/50 |
| 2009/0168985 A1* | 7/2009 | Yu et al. | 379/202.01 |
| 2009/0187549 A1* | 7/2009 | Samn | 707/4 |
| 2009/0222741 A1* | 9/2009 | Shaw et al. | 715/753 |
| 2009/0225970 A1* | 9/2009 | Grigsby et al. | 379/202.01 |
| 2009/0254563 A1* | 10/2009 | Arnold et al. | 707/10 |
| 2009/0303984 A1* | 12/2009 | Clark et al. | 370/352 |
| 2009/0327425 A1* | 12/2009 | Gudipaty | 709/205 |
| 2010/0040217 A1* | 2/2010 | Aberg et al. | 379/202.01 |
| 2010/0088414 A1* | 4/2010 | Lin et al. | 709/227 |
| 2010/0130180 A1* | 5/2010 | Lim | 455/414.1 |

OTHER PUBLICATIONS

Borner, et al., "Visualizing Chat Log Data Collected in 3-D Virtual Worlds", IEEE (2001), pp. 141-146.

Chang, et al., "Implementation of a Virtual Chat Room for Multimedia Communications", (1999), pp. 599-604.

* cited by examiner

SYSTEM AND METHOD FOR JOINING A CONVERSATION

TECHNICAL FIELD

This disclosure relates to instant messaging systems and, more particularly, to methodologies for joining existing conversations taking place on such instant messaging systems.

BACKGROUND

Instant messaging provides real-time text-based communication between two or more users interacting via computers or mobile devices. The more immediate and direct interaction provided by instant messaging often tends to more closely resemble a conversation, as compared to the more "letter like" format of email. The direct interaction between users may provide highly effective and convenient collaboration. For example, problems of unanswered emails and unreturned phone messages may be avoided.

Unfortunately, instant messaging conversations are not as easily joined as traditional conversations. For example, assume that three people are talking in the corridor. From a distance, a fourth person may see them, so that person may decide to walk over and join them in the conversation and make a contribution. That fourth person may have joined the conversation because they spotted the three people talking, or because the fourth person overheard something in passing. Either way, a social interaction took place that allowed the fourth person to join the other three people in conversation. Unfortunately, as instant messaging conversations are often private, the ability to "see" people involved in a conversation or overhear the topic of discussion does not exist. Accordingly, the opportunities to join an instant messaging conversation may not be as readily available as with those of traditional conversations.

SUMMARY OF DISCLOSURE

In a first implementation, a method includes receiving a join request, from a requester, to join an online conversation in which an online user of an instant messaging system is participating. A notification is provided to the online user that the requester would like to join the online conversation.

One or more of the following features may be included. A notification response may be received from the online user concerning the notification. If the notification response received is a positive notification response, the requester may be allowed to join the online conversation. If the notification response received is a negative notification response, the requester may not be allowed to join the online conversation.

An information request may be received, from the requester, for conversation information concerning the online conversation. The conversation information concerning the online conversation may be obtained. The conversation information may be provided to the requestor.

The conversation information may include conversation duration information. Obtaining the conversation information may include determining the conversation duration information for the online conversation. Providing the conversation information may include providing the conversation duration information to the requestor.

The conversation information may include conversation participant information. Obtaining the conversation information may include determining the conversation participant information for the online conversation. Providing the conversation information may include providing the conversation participant information to the requestor.

The conversation information may include conversation topic information. Obtaining the conversation information may include determining the conversation topic information for the online conversation. Providing the conversation information may include providing the conversation topic information to the requestor.

In another implementation, a computer program product resides on a computer readable medium and has a plurality of instructions stored on it. When executed by a processor, the instructions cause the processor to perform operations including receiving a join request, from a requester, to join an online conversation in which an online user of an instant messaging system is participating. A notification is provided to the online user that the requester would like to join the online conversation.

One or more of the following features may be included. A notification response may be received from the online user concerning the notification. If the notification response received is a positive notification response, the requestor may be allowed to join the online conversation. If the notification response received is a negative notification response, the requestor may not be allowed to join the online conversation.

An information request may be received, from the requester, for conversation information concerning the online conversation. The conversation information concerning the online conversation may be obtained. The conversation information may be provided to the requester.

The conversation information may include conversation duration information. Obtaining the conversation information may include determining the conversation duration information for the online conversation. Providing the conversation information may include providing the conversation duration information to the requester.

The conversation information may include conversation participant information. Obtaining the conversation information may include determining the conversation participant information for the online conversation. Providing the conversation information may include providing the conversation participant information to the requester.

The conversation information may include conversation topic information. Obtaining the conversation information may include determining the conversation topic information for the online conversation. Providing the conversation information may include providing the conversation topic information to the requester.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
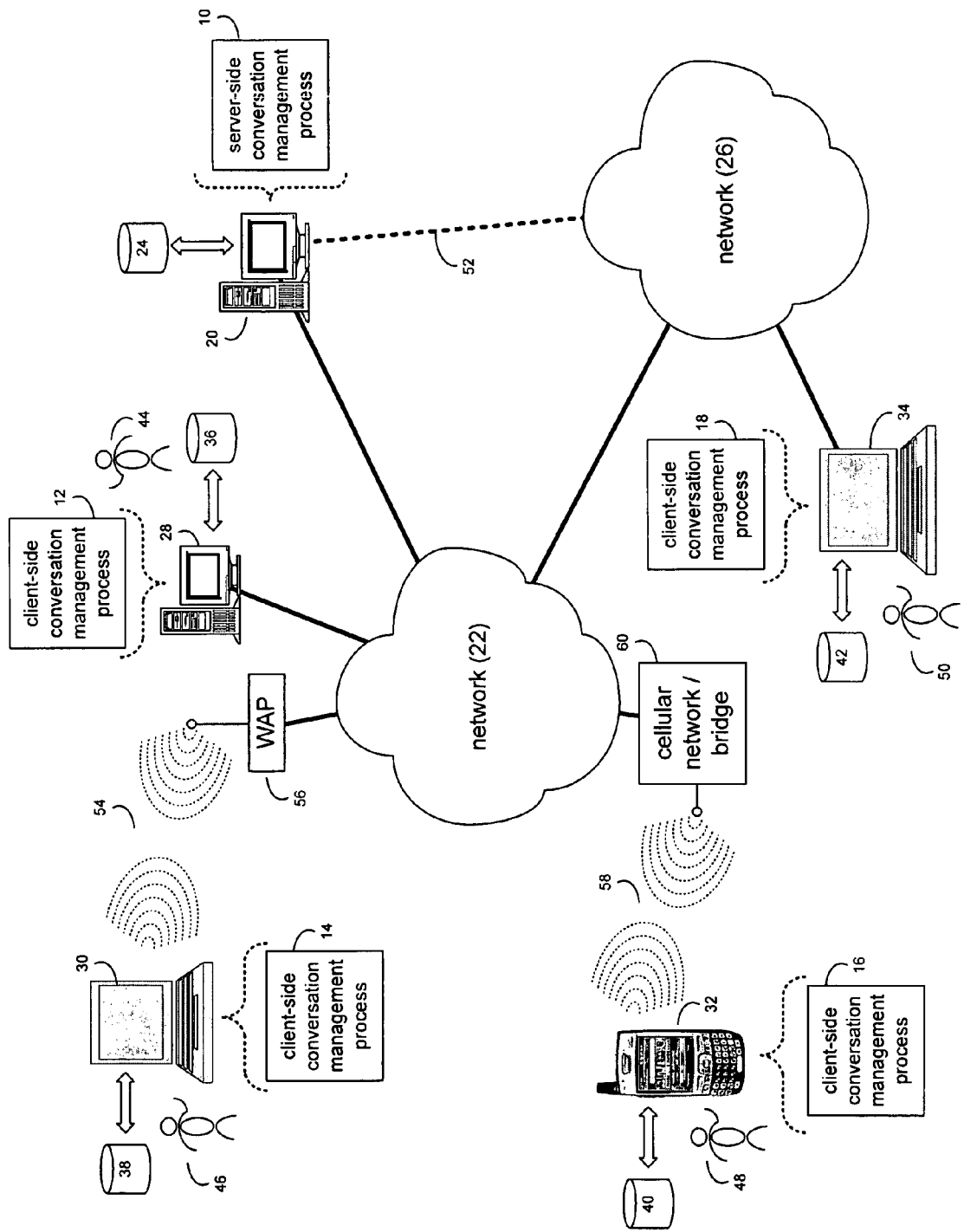
FIG. 1 is a diagrammatic view of an conversation management process coupled to a distributed computing network.
Figure 2:
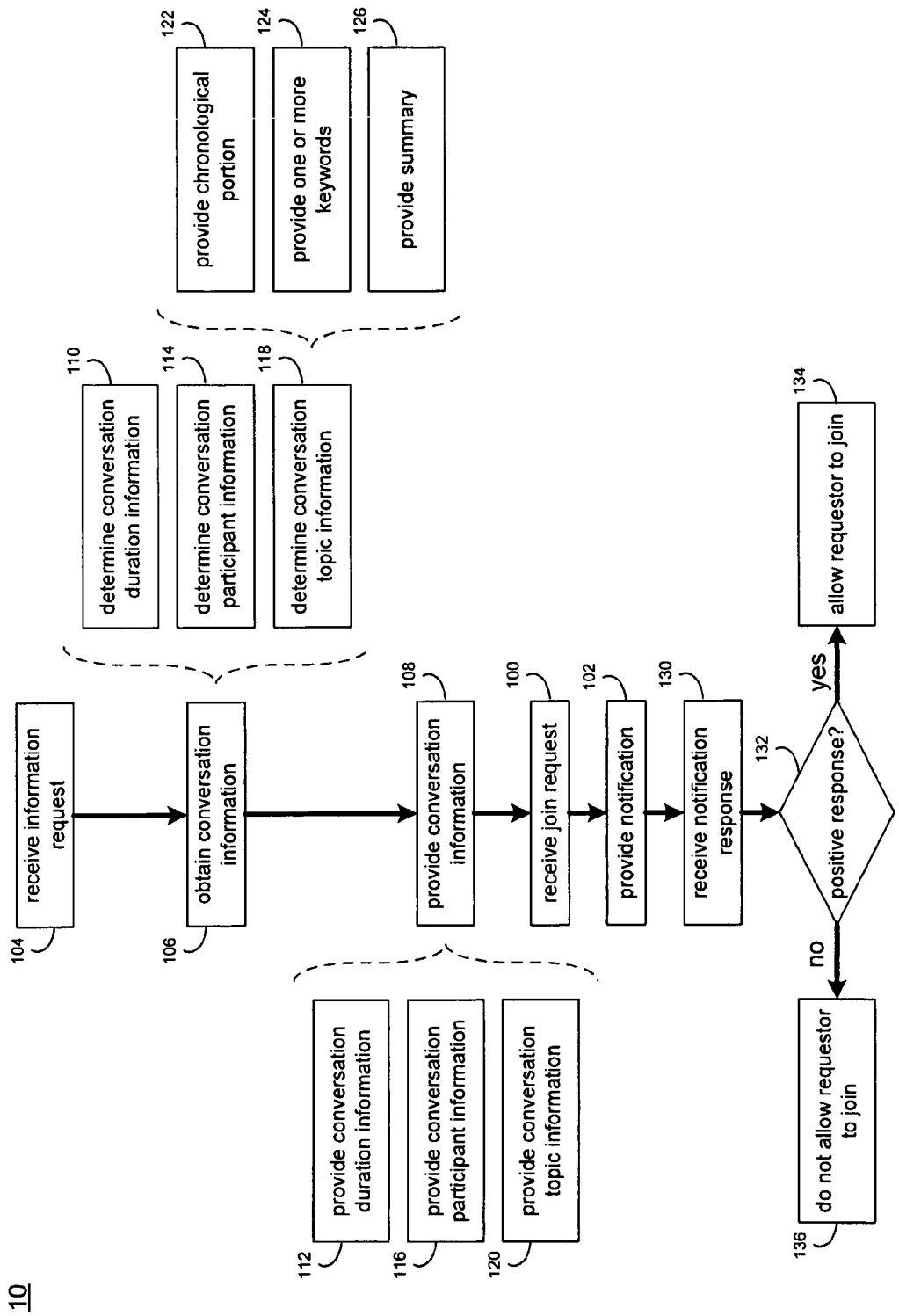
FIG. 2 is a flowchart of the conversation management process of FIG. 1.

System Overview:

Referring to FIGS. 1 & 2, there is shown a conversation management process 10. As will be discussed below, conversation management process 10 may receive 100 a join request, from a requester, to join an online conversation in which an online user of an instant messaging system is participating. A notification may be provided 102 to the online user that the requestor would like to join the online conversation.

The conversation management process may be a server-side process (e.g., server-side conversation management process 10), a client-side process (e.g., client-side conversation management process 12, client-side conversation management process 14, client-side conversation management process 16, or client-side conversation management process 18), or a hybrid server-side/client-side process (e.g., the combination of server-side conversation management process 10 and one or more of client-side conversation management processes 12, 14, 16, 18).

Server-side conversation management process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side conversation management process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for access to server computer 20 (via network 22) using one or more protocols, examples of which may include but are not limited to HTTP (i.e., HyperText Transfer Protocol), SIP (i.e., session initiation protocol), and the Lotus Sametime™ VP protocol. Network 22 may be connected to one or more secondary networks (e.g., network 26), examples of which may include but are not limited to: a local area network; a wide area network; or an intranet, for example.

Client-side conversation management processes 12, 14, 16, 18 may reside on and may be executed by client electronic devices 28, 30, 32, 34 (respectively), examples of which may include but are not limited to personal computer 28, laptop computer 30, personal digital assistant 32, notebook computer 34, a data-enabled, cellular telephone (not shown), and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side conversation management processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Examples of client-side conversation management processes 12, 14, 16, 18 may include but are not limited to a process incorporated into and executed within a client-side instant messaging application (e.g., Microsoft IM™ and Lotus Sametime™), which allows for instant-message based communication between a plurality of users (e.g., users 46, 48). Examples of server-side conversation management process 10 may include a process incorporated into and executed within a server-side instant messaging application (e.g., Microsoft IM Server™ and Lotus Sametime Server™) Alternatively, client-side conversation management processes 12, 14, 16, 18 and/or server-side conversation management process 10 may be stand-alone applications that work in conjunction with (i.e., interface with) a client-side instant messaging application and/or a server-side instant messaging application (respectively). One or more of client-side conversation management processes 12, 14, 16, 18 and server-side conversation management process 10 may interface with each other (via network 22 and/or network 26) to allow a plurality of users (e.g., user 46, 48) to transmit instant messages to each other.

Users 44, 46, 48, 50 may access server-side conversation management process 10 directly through the device on which the client-side conversation management process (e.g., client-side conversation management processes 12, 14, 16, 18) is executed, namely client electronic devices 28, 30, 32, 34, for example. Users 44, 46, 48, 50 may access server-side conversation management process 10 directly through network 22 and/or through secondary network 26. Further, server computer 20 (i.e., the computer that executes server-side conversation management process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Personal digital assistant 32 is shown wirelessly coupled to network 22 via wireless communication channel 58 established between personal digital assistant 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Conversation Management Process:

For the following discussion, server-side conversation management process 10 is going to be described for illustrative purposes, in which client-side conversation management processes 12, 14, 16, 18 are processes incorporated into and executed within a client-side instant messaging application (e.g., Microsoft IM™ and Lotus Sametime™) that allow for communication with server-side conversation management process 10. However, this is not intended to be a limitation of this disclosure, as other configurations are possible (e.g., stand-alone, client-side conversation management processes and/or stand-alone server-side conversation management processes.

Server-side conversation management process 10 may receive 104 a request for conversation information from a requester (e.g., user 44). This request received 104 may concern an online user (e.g., users 46, 50) of an instant messaging system. The conversation information concerning the online user (e.g., users 46, 50) may be obtained 106 and provided 108 to the requester (e.g., user 44).

Figure 3:
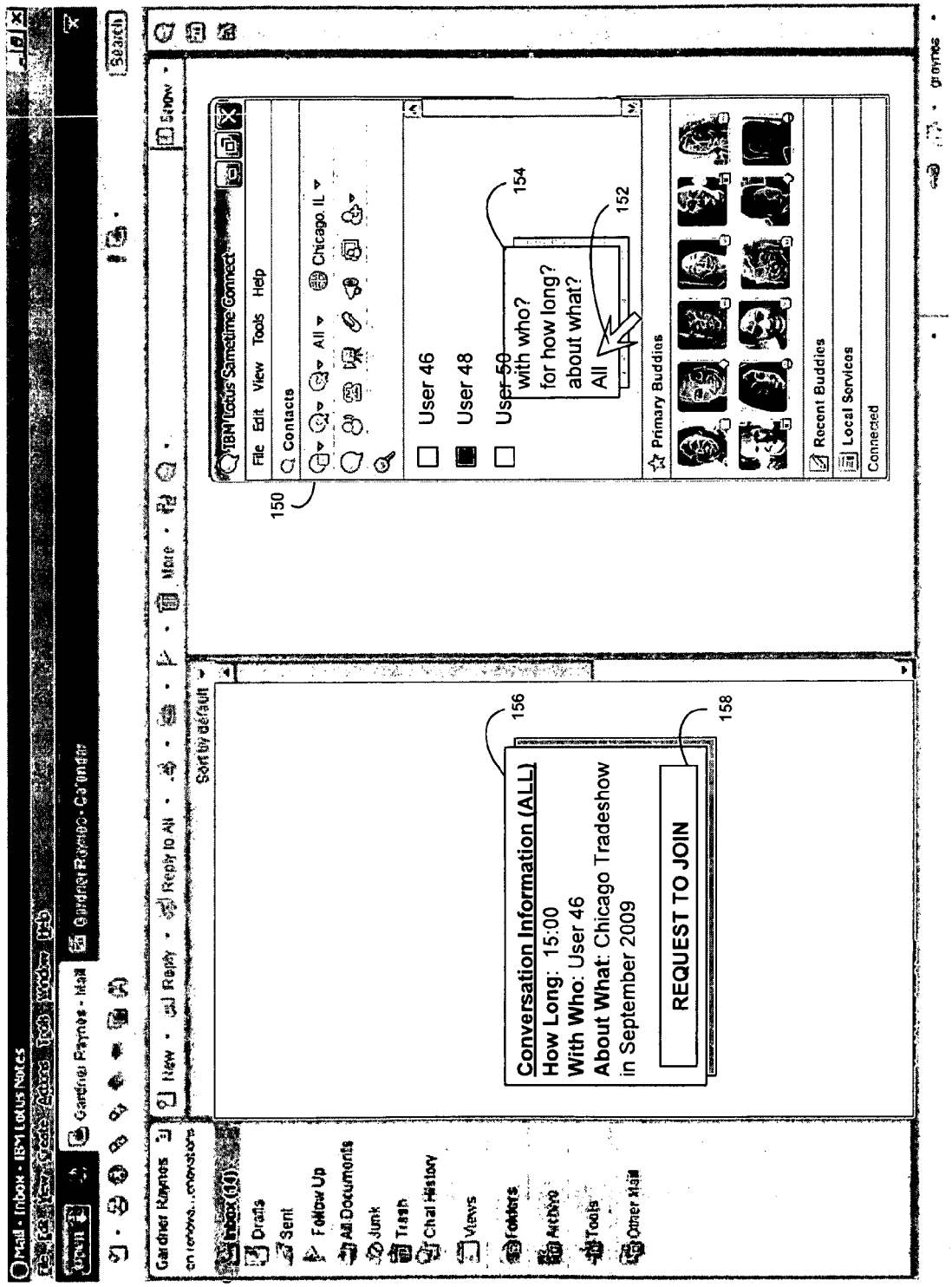
FIG. 3 is a diagrammatic view of a display screen rendered, at least in part, by the conversation management process of FIG. 1.

For example and referring also to FIG. 3, users 46, 50 are shown to be online within instant messaging user window 150. Further, user 48 is shown to be off-line. Assume for illustrative purposes that user 44, upon noticing that users 46, 50 are online, may be interested in joining an instant-messaging conversation being participated in by one or both of users 46, 50. Accordingly, user 44 may initiate a request for information concerning the conversations in which users 46, 50 are participating.

Additionally/alternatively, the request for information concerning conversations may be automatically initiated by one or more conversation management process (e.g., by one or more of server-side conversation management process 10 and/or one or more client-side conversation management processes 12, 14, 16, 18). For example, based upon, at least in part, user (or system-wide) established configurations, the conversation management process may periodically (e.g., at predetermined time intervals) initiate a request for information concerning conversations being participated in by one or more of a given user's buddies (e.g., those individuals residing in the user's instant messaging buddies list). Further, the conversation management process may display the conversation status of each of the individuals (e.g., whether the individual is in an instant messaging conversation, with whom, and for how long) associated with the respective individual in the user's instant messaging buddies list.

Accordingly, user 44 may initiate a request by e.g. positioning onscreen pointer 152 (controllable by a pointing device such as a mouse, not shown) near the user symbol (e.g. a green square) and e.g. right-click the pointing device (not shown). Upon receiving 104 the request for conversation information from user 44, server-side conversation management process 10 may render pop-up window 154 that allows user 44 to select the particular type of conversation information they are interested in.

While pop-up window 154 rendered by server-side conversation management process 10 is shown to include four different types of available conversation information, namely "with who?", "for how long?", "about what?" and "all", this is for illustrative purposes only and is not intended to be a limitation of this disclosure, as the actual number of types of available conversation information may vary depending upon e.g. user needs and design criteria.

If, when requesting conversation information, user 44 is interested in conversation duration information, user 44 may select "for how long?" using onscreen pointer 152. If user 44 selects "for how long?", server-side conversation management process 10 may determine 110 the conversation duration information for a conversation in which the online user (e.g. user 50) is participating. For example, assume that user 50 is participating in an instant messaging conversation with user 46, which has been taking place for 15:00 minutes. Upon determining 110 this conversation duration information, server-side conversation management process 10 may provide 112 the conversation duration information to the requester (e.g. user 44). When providing 112 (user 44) with this conversation duration information, server-side conversation management process 10 may render pop-up information window 156 that defines the conversation duration information as "15:00" minutes.

If, when requesting conversation information, user 44 is interested in conversation participant information, user 44 may select "with who?" using onscreen pointer 152. If user 44 selects "with who?", server-side conversation management process 10 may determine 114 the conversation participant information for the conversation in which the online user (e.g., user 50) is participating. For example and as discussed above, assume that user 50 is participating in instant messaging conversation with user 46. Upon determining 110 this conversation participant information, server-side conversation management process 10 may provide 116 the conversation participant information to the requester (e.g. user 44). When providing 116 the conversation participant information to the requester, server-side conversation management process 10 may render pop-up information window 156 that defines the conversation participant information as "User 46".

When determining 114 which users are participating within a conversation, conversation management process 10 may define time limits for making such a determination. For example, a participant of a conversation may be deemed a person who has contributed to the conversation within the last three minutes. Accordingly, assume that two other users (not shown) were initially engaged in a conversation with User 46 and User 50. However, further assume that neither of the two other users (not shown) has contributed to the conversation in at least twenty minutes, conversation management process 10 may not consider either of these two other users (not shown) to be participants within the above-described conversation. Additionally/alternatively, the level/position of the user may be taken into consideration when deciding whether a user is engaged in a conversation. For example, a high-level executive who has not participated in a conversation for twenty minutes may still be considered to be engaged in the conversation (for conversation management purposes) due to their high-level position within the company.

If, when requesting conversation information, user 44 is interested in conversation topic information, user 44 may select "about what?" using onscreen pointer 152. If user 44 selects "about what?", server-side conversation management process 10 may determine 118 the conversation topic information for the conversation in which the online user (e.g. user 50) is participating. For example and as discussed above, assume that user 50 is participating in an instant messaging conversation with user 46. Further assume that this instant messaging conversation concerns an upcoming trade show in Chicago. Upon determining 118 this conversation topic information, server-side conversation management process 10 may provide 120 the conversation topic information to the requester (e.g. user 44). When providing 120 the conversation topic information to the requester, server-side conversation management process 10 may render pop-up information window 156 that defines the conversation topic information as "Chicago Trade Show in September 2009". Additionally, as an instant messaging conversation may have multiple topics, when providing 120 the conversation topic information to the requester, server-side conversation management process 10 may render pop-up information window 156 that defines a plurality of topics.

Determining 118 the conversation topic information may include one or more of: providing 122 a chronological portion of the conversation to the requester; providing 124 one or more keywords concerning the conversation to the requester; and providing 126 a summary of at least a portion of the conversation to the requester.

Providing 122 a chronological portion of the conversation to the requester may include providing any portion of the text messages provided between users 46, 50 that may prove to be indicative of the topic of the conversation. For example, server-side conversation management process 10 may provide to user 46 the first e.g. four text messages passed between users 46, 50. For example, server-side conversation management process 10 may provide user 44 with the following information within pop-up information window 156:

User 46: Got a moment?
User 50: Sure . . . what's up?
User 46: Are you going to this Chicago Trade Show?
User 50: Yes I am . . . how about you?

Providing 124 one or more keywords concerning the conversation to the requester may include searching all or a portion of the text messages passed between users 46, 50 to extract pertinent keywords. For example, server-side conversation management process 10 may process all or a portion of the text messages passed between users 46, 50 to filter common words that do not substantively add to the conversation. For example, server-side conversation management process 10 may filter numerous generic words (examples of which may include but are not limited to: to; a; an; and; the; if; and then) to determine the topic of the conversation between users 46, 50. For example, server-side conversation management process 10 may provide user 44 with the following information within pop-up information window 156:

Chicago, Tradeshow, September

Providing 126 a summary of at least a portion of the conversation to the requester may include processing all or a portion of the text messages passed between users 46, 50 to generate a summary of such messages. For example, server-side conversation management process 10 may include an automatic summarization process (not shown) that may process all or a portion of the text messages passed between users 46, 50 to automatically generate a summary of such messages. Alternatively, server-side conversation management process 10 may use an external automatic summarization process (e.g., Copernic Summarizer™) for processing and summarizing all or a portion of the text messages passed between users 46, 50. For example, server-side conversation management process 10 may provide user 44 with the following information within pop-up information window 156:

Chicago Tradeshow in September of 2009

If, when requesting conversation information, user 44 is interested in "all" conversation information, user 44 may select "All" using onscreen pointer 152. If user 44 selects "All", server-side conversation management process 10 may determine 110 the conversation duration information, may determine 114 the conversation participant information, and may determine 118 the conversation topic information for the conversation in which the online user (e.g. user 50) is participating. For example, assume that user 50 is participating in an instant messaging conversation with user 46, which has been taking place for 15:00 minutes and concerns the topic "Chicago Tradeshow in September of 2009" (as summarized by the automatic summarization process discussed above). Upon determining 110, 114, 118 this conversation duration, participant, and topic information, server-side conversation management process 10 may provide 112, 116, 120 the conversation duration, participant and topic information to the requester (e.g. user 44). When providing 112, 116, 120 this conversation duration, participant and topic information, server-side conversation management process 10 may render pop-up information window 156 that defines the conversation duration, participant and topic information as "15:00", "User 46" and "Chicago Tradeshow in September of 2009" (as illustrated within pop-up information window 156).

In addition to providing the user with summary information concerning an instant messaging conversation, conversation management process 10 may be configured to simply provide e.g., user 44 with an entire transcript of the complete instant messaging conversation. Accordingly, if two users were engaged in a conversation for twenty minutes, conversation management process 10 may be configured to provide the requester with a transcript of the entire twenty minute conversation.

When information (e.g., duration information, participant information, and topic information) is provided to a requester, conversation management process 10 may allow the requester to save some or all of this information for subsequent retrieval and use.

The specific information available to a requester may vary depending on the rights of the requester. For example, a "super-user" may be allowed to see all information concerning any conversation (including the complete transcript), while a low-level user may only be allowed to see the participant information. Further, a senior user may have more rights than a junior user.

While the system is described above as requiring the user of the above-described system to right-click the pointing device (not shown), this is for illustrative purposes only and is not intended to be a limitation of this disclosure as other configurations are possible. For example, user 44 may simply allow onscreen pointer 152 to hover over a user symbol (e.g. a green square) associated with a user who may be participating in a conversation. A visual cue (not shown) may be rendered by server-side conversation management process 10 that allows e.g., user 44 to discern whether e.g., user 50 is currently involved in a conversation.

Additionally, while the system is described above as requiring the user to select the type of information that they are interested in, this is for illustrative purposes only, as other configurations are possible. For example, if user 50 is indeed involved in a conversation, server-side conversation management process 10 may automatically render pop-up information window 156 that defines all pertinent information (e.g., who user 50 is talking to, what they are talking about, how long they have been talking, etc.). If user 50 is participating in simultaneous, multiple independent conversations, multiple pop-up windows may be rendered (one for each conversation) or pop-up information window 156 may be sized to allow for the simultaneous display of information concerning all of the independent conversations.

When engaging in an instant messaging conversation, a user may define the conversation as "private" if they do not want to allow others to determine e.g., who they are talking to, how long they have been talking and what they are talking about. The manner in which a user may define a conversation as "private" may vary based upon e.g., the specific instant messaging program and the manner in which the program is implemented. For example, when engaged in a conversation, a user may open an options window (not shown) that may allow the user to define the conversation as private. Accordingly, when an instant messaging conversation is defined as private, server-side conversation management process 10 may not provide a requester with information concerning the conversation duration, the conversation participants, and the conversation topic. Accordingly, in the event that the requester right-clicks the pointing device (or hovers) over a user symbol of a user who is engaged in a private conversation, the requester may simply be provided with information concerning the private nature of the conversation.

Assume for illustrative purposes that user 44, upon reading the information rendered within pop-up information window 156, wishes to join in on the discussion between user 46 and user 50, as user 44 plans on attending the Chicago Tradeshow in September 2009. Pop-up window 156 may include "Request to Join" button 158 that may be selectable by user 44 via onscreen pointer 152. Upon user 44 selecting "Request to Join" button 158, conversation management process 10 may receive 100 a join request (not shown), from user 44 (i.e., the requester), to join the online conversation between (in this example) user 46 and user 50.

Figure 4:
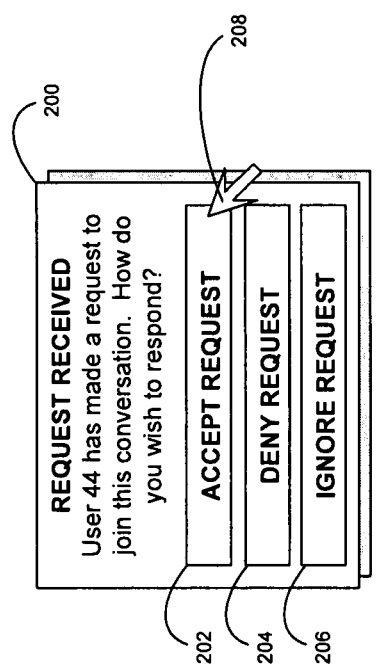
FIG. 4 is a diagrammatic view of a display screen rendered, at least in part, by the conversation management system of FIG. 1.

Referring also to FIG. 4, conversation management process 10 may provide 102 a notification to one or more of the online users involved in the subject online conversation (i.e., user 46 and/or user 50) that user 44 would like to join the subject conversation. One example of such a notification may include notification window 200 being rendered by conversation management process 10, which may be displayed (e.g., pop-up) within the display of e.g., laptop computer 30 (i.e., the client electronic device utilized by user 46) and/or the display of notebook computer 34 (i.e., the client electronic device utilized by user 50). In this particular illustrative embodiment of notification window 200, notification window 200 is shown to include three response buttons, namely "Accept Request" button 202, "Deny Request" button 204, and "Ignore Request" button 206, each of which may be selectable via onscreen pointing device 208. Upon selecting one of buttons 202, 204, 206, a notification response (not shown) may be generated and provided to conversation management process 10. Upon receiving 130 the notification response (not shown) from one or more of e.g., users 46, 50, the notification response (not shown) may be processed 132 to determine if the notification response is a positive notification response.

If the user (e.g., user 46 and/or user 50) selects "Accept Request" button 202, a positive notification response may be generated that, upon being processed 132 by conversation management process 10, may allow 134 user 44 to join the conversation between user 46 and user 50. User 44 may be notified by conversation management process 10 that user 44 has been allowed 134 to join the subject conversation and notification window 200 may be deleted. User 44 may be added (i.e., joined) to the conversation between user 46 and user 50.

If the user (e.g., user 46 and/or user 50) selects "Deny Request" button 204, a negative notification response may be generated that, upon being processed 132 by conversation management process 10, may not allow 136 user 44 to join the conversation between user 46 and user 50. User 44 may be notified by conversation management process 10 that user 44 has not been allowed 136 to join the subject conversation and notification window 200 may be deleted. User 44 may not be added (i.e., joined) to the conversation between user 46 and user 50.

If the user (e.g., user 46 and/or user 50) selects "Ignore Request" button 206, a negative notification response may be generated that, upon being processed 132 by conversation management process 10, may not allow 136 user 44 to join the conversation between user 46 and user 50. User 44 may not be notified by conversation management process 10 that user 44 has not been allowed 134 to join the subject conversation. Alternatively, upon selecting "Ignore Request" button 206, a notification response may not be generated and notification window 200 may simply be deleted. User 44 may not be added (i.e., joined) to the conversation between user 46 and user 50.

A number of implementations have been described. Nevertheless, it will be understood that various modifications may be made. Accordingly, other implementations are within the scope of the following claims.

What is claimed is:

1. A computer implemented method, comprising:
   receiving, by a computing device, an information request, from a requester, for conversation information concerning an instant messaging conversation in which an online user of an instant messaging system is participating;
   obtaining, by the computing device, the conversation information concerning the instant messaging conversation, wherein the conversation information includes a topic of the instant messaging conversation, and wherein obtaining the conversation information includes determining the topic of the instant messaging conversation;
   providing, to the requestor, one or more keywords by, at least in part, filtering one or more generic words of the instant messaging conversation to determine the topic of the instant messaging conversation;
   providing, to the requestor, one or more words remaining after filtering the one or more generic words of the instant messaging conversation;
   providing, by the computing device, the conversation information to the requestor, wherein the conversation information includes the topic of the instant messaging conversation based on the one or more filtered generic words of the instant messaging conversation;
   receiving, by the computing device, a join request, from the requestor, to join the instant messaging conversation in which the online user of the instant messaging system is participating; and
   providing, by the computing device, a notification to the online user that the requestor would like to join the instant messaging conversation.

2. The computer implemented method of claim 1 further comprising:
   receiving a notification response from the online user concerning the notification.

3. The computer implemented method of claim 1 further comprising:
   if the notification response received is a positive notification response, allowing the requestor to join the instant messaging conversation; and
   if the notification response received is a negative notification response, denying the requestor from joining the instant messaging conversation.

4. The computer implemented method of claim 1 wherein the conversation information includes conversation duration information.

5. The computer implemented method of claim 4 wherein:
obtaining the conversation information includes determining the conversation duration information for the instant messaging conversation; and
providing the conversation information includes providing the conversation duration information to the requestor.

6. The computer implemented method of claim 1 wherein the conversation information includes conversation participant information.

7. The computer implemented method of claim 6 wherein:
obtaining the conversation information includes determining the conversation participant information for the instant messaging conversation; and
providing the conversation information includes providing the conversation participant information to the requestor.

8. The computer implemented method of claim 1 wherein the conversation information includes whether the online user of the instant messaging system is in the instant messaging conversation.

9. The computer implemented method of claim 1 wherein providing the conversation information includes providing the conversation topic information to the requestor.

10. A computer program product residing on a non-transitory computer readable medium having a plurality of instructions stored thereon, which, when executed by a processor, cause the processor to perform operations comprising:
receiving an information request, from a requester, for conversation information concerning an instant messaging conversation in which an online user of an instant messaging system is participating;
obtaining the conversation information concerning the instant messaging conversation, wherein the conversation information includes a topic of the instant messaging conversation, and wherein obtaining the conversation information includes determining the topic of the instant messaging conversation;
providing, to the requestor, one or more keywords by, at least in part, filtering one or more generic words of the instant messaging conversation to determine the topic of the instant messaging conversation;
providing, to the requestor, one or more words remaining after filtering the one or more generic words of the instant messaging conversation;
providing the conversation information to the requestor, wherein the conversation information includes the topic of the instant messaging conversation based on the one or more filtered generic words of the instant messaging conversation;
receiving a join request, from the requestor, to join the instant messaging conversation in which the online user of the instant messaging system is participating; and
providing a notification to the online user that the requestor would like to join the instant messaging conversation.

11. The computer program product of claim 10 further comprising instructions for:
receiving a notification response from the online user concerning the notification.

12. The computer program product of claim 10 further comprising instructions for:
if the notification response received is a positive notification response, allowing the requestor to join the instant messaging conversation; and
if the notification response received is a negative notification response, denying the requestor from joining the instant messaging conversation.

13. The computer program product of claim 10 wherein the conversation information includes conversation duration information.

14. The computer program product of claim 13 wherein:
the instructions for obtaining the conversation information include instructions for determining the conversation duration information for the instant messaging conversation; and
the instructions for providing the conversation information include instructions for providing the conversation duration information to the requestor.

15. The computer program product of claim 10 wherein the conversation information includes conversation participant information.

16. The computer program product of claim 15 wherein:
the instructions for obtaining the conversation information include instructions for determining the conversation participant information for the instant messaging conversation; and
the instructions for providing the conversation information include instructions for providing the conversation participant information to the requestor.

17. The computer program product of claim 10 wherein the conversation information includes whether the online user of the instant messaging system is in the instant messaging conversation.

18. The computer program product of claim 10 wherein the instructions for providing the conversation information include instructions for providing the conversation topic information to the requestor.

* * * * *